United States Patent
Jeong et al.

(10) Patent No.: US 8,140,334 B2
(45) Date of Patent: Mar. 20, 2012

(54) APPARATUS AND METHOD FOR RECOGNIZING VOICE

(75) Inventors: Sang-bae Jeong, Suwon-si (KR); Nam-hoon Kim, Suwon-si (KR); Jeong-su Kim, Yongin-si (KR); In-jeong Choi, Hwaseong-si (KR); Ick-sang Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1108 days.

(21) Appl. No.: 11/475,963

(22) Filed: Jun. 28, 2006

(65) Prior Publication Data
US 2007/0083371 A1    Apr. 12, 2007

(30) Foreign Application Priority Data
Oct. 6, 2005   (KR) .................. 10-2005-0094068

(51) Int. Cl.
*G10L 15/14* (2006.01)
*G10L 15/00* (2006.01)

(52) U.S. Cl. ............. 704/256.7; 704/256; 704/239
(58) Field of Classification Search .......... 704/239, 704/256–256.8, 251
See application file for complete search history.

(56) References Cited

U.S. PATENT DOCUMENTS

| | | | | |
|---|---|---|---|---|
| 5,794,198 A | * | 8/1998 | Takahashi et al. | 704/256 |
| 6,064,958 A | * | 5/2000 | Takahashi et al. | 704/243 |
| 2006/0009980 A1 | * | 1/2006 | Burke et al. | 704/270 |

* cited by examiner

*Primary Examiner* — Angela A Armstrong
(74) *Attorney, Agent, or Firm* — Staas & Halsey LLP

(57) ABSTRACT

An apparatus and method for recognizing voice. The apparatus includes a feature vector extraction unit dividing an input voice signal into predetermined unit regions, and extracting feature vectors corresponding to each of the unit regions; a predicted node extraction unit extracting a list of second nodes whose travels to a first node corresponding to the extracted feature vectors are predicted, with reference to a network of one or more nodes; a single waveform similarity calculation unit calculating degrees of single waveform similarity of the first node and the second nodes of the list by substituting the extracted feature vectors into single waveform probability distributions that constitute voice signals corresponding to the second nodes; a multiple waveform similarity calculation unit calculating degrees of multiple waveform similarity by substituting the extracted feature vectors into multiple waveform probability distributions that constitute single waveform probability distributions usable to calculate the degrees of single waveform similarity in a preset range; and an output unit outputting a function-performing signal corresponding to a multiple waveform probability distribution that enables calculation of a highest of the calculated degrees of multiple waveform similarity.

29 Claims, 7 Drawing Sheets

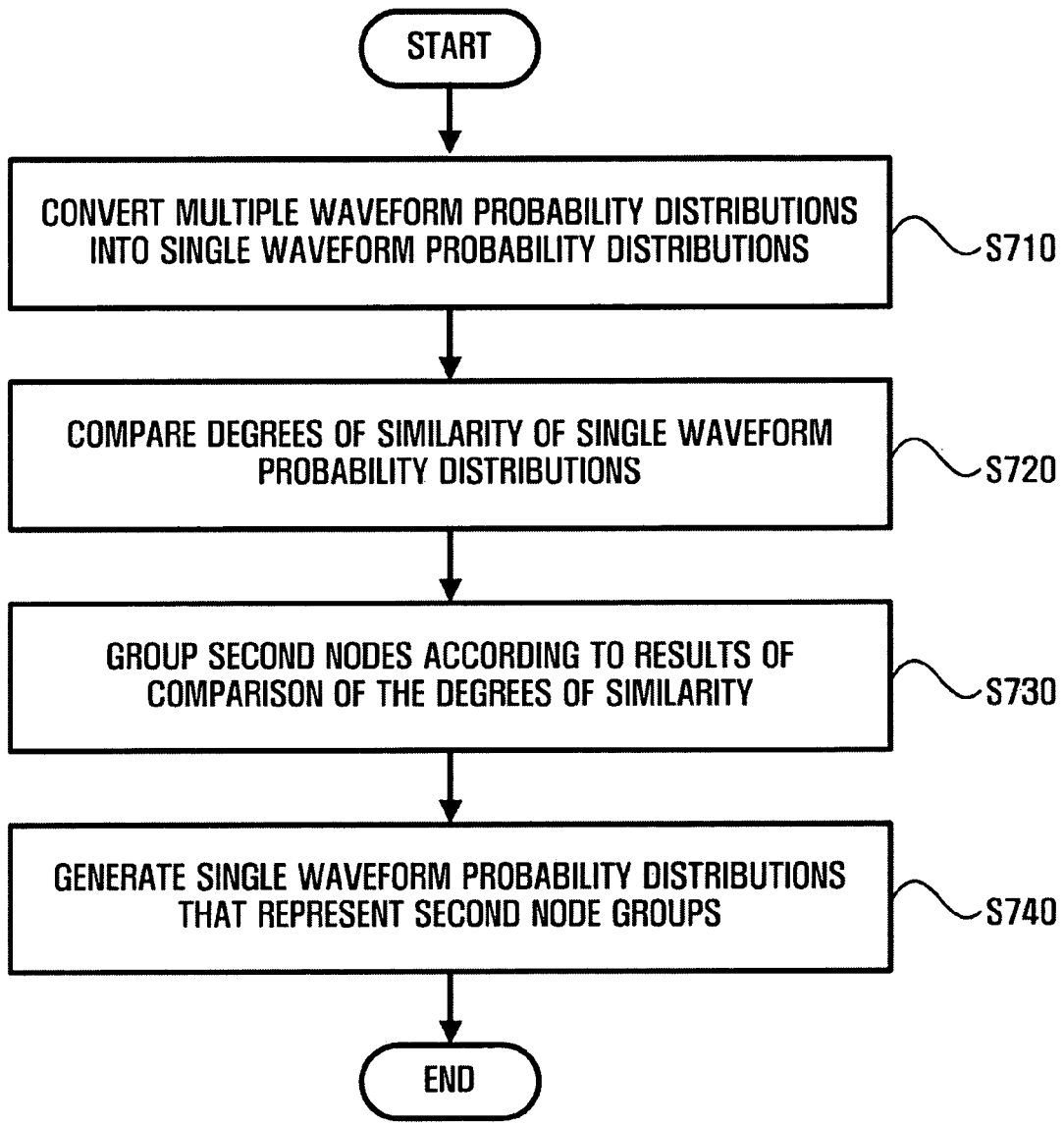

FIG. 8

64 NUMBERS OF GROUPS (810)

| RANGE OF SCORES | 300 | 500 | 750 | 1000 | 1250 | 1500 |
|---|---|---|---|---|---|---|
| RECOGNITION RATE(%) | 84.33 | 88.33 | 89.83 | 90.67 | 91 | 91.5 |
| TOTAL RESPONSE TIME(ms) | 40481 | 42164 | 51225 | 62267 | 74363 | 83985 |
| TOTAL SCORE RESPONSE TIME(ms) | 10423 | 15485 | 24650 | 36230 | 48384 | 58060 |
| MEMORY(kb) | 20.22 | | | | | |
| RESPONSE TIME/TEST DB | 67.47 | 70.27 | 85.38 | 103.78 | 123.94 | 139.98 |

88 NUMBERS OF GROUPS (820)

| RANGE OF SCORES | 300 | 500 | 750 | 1000 | 1250 | 1500 |
|---|---|---|---|---|---|---|
| RECOGNITION RATE(%) | 82.83 | 88.33 | 89.67 | 90.67 | 91.17 | 91.5 |
| TOTAL RESPONSE TIME(ms) | 40095 | 40971 | 48205 | 58130 | 68615 | 78188 |
| TOTAL SCORE RESPONSE TIME(ms) | 8759 | 14311 | 22220 | 32857 | 43231 | 52946 |
| MEMORY(kb) | 27.78 | | | | | |
| RESPONSE TIME/TEST DB | 66.83 | 68.29 | 80.34 | 96.88 | 114.36 | 130.31 |

128 NUMBERS OF GROUPS (830)

| RANGE OF SCORES | 300 | 500 | 750 | 1000 | 1250 | 1500 |
|---|---|---|---|---|---|---|
| RECOGNITION RATE(%) | 85.17 | 88.5 | 89.33 | 90.17 | 91.17 | 91.33 |
| TOTAL RESPONSE TIME(ms) | 38471 | 39779 | 46824 | 56466 | 66652 | 75996 |
| TOTAL SCORE RESPONSE TIME(ms) | 8472 | 13242 | 21844 | 31930 | 41881 | 50471 |
| MEMORY(kb) | 40.38 | | | | | |
| RESPONSE TIME/TEST DB | 67.12 | 66.30 | 78.04 | 94.11 | 111.09 | 126.66 |

US 8,140,334 B2

APPARATUS AND METHOD FOR RECOGNIZING VOICE

CROSS-REFERENCE TO RELATED APPLICATION

This application claims priority from Korean Patent Application No. 10-2005-0094068 filed on Oct. 6, 2005 in the Korean Intellectual Property Office, the disclosure of which is incorporated herein by reference.

BACKGROUND OF THE INVENTION

1. Field of the Invention

The present invention relates to an apparatus and method for recognizing voice and, more particularly, to an apparatus and method for recognizing voice, which calculate scores for hidden Markov model states that represent feature parameters for each predetermined phonetic unit, using approximated single waveform probability distributions, and recalculate only scores for hidden Markov model states, having higher scores, using multiple waveform probability distributions.

2. Description of Related Art

The term 'voice recognition' refers to a series of processes of extracting phoneme and linguistic information from acoustic information included in voice, and causing a machine to recognize and respond to it.

Voice recognition algorithms include a Dynamic Time Warping (DTW) algorithm, a Neural Network (NN) algorithm, and a Hidden Markov Model (HMM) algorithm.

Of these voice recognition algorithms, the HMM algorithm statistically models a phonetic unit (phoneme or word), and is one of the voice recognition technology algorithms that have prevailed since the latter half of the 1980s. The HMM handles variation in a voice signal based on probability, so that it has an advantage in that variation in an input voice can be represented well, compared to Dynamic Programming Matching (DPM). Furthermore, the HMM can learn the parameters of models (coefficients for probability calculation) from a large volume of voice data and can generate better models by assigning high-quality data sets.

Each model obtained by performing modeling using the HMM represents a single phonetic element, and a single phonetic element generally has three states.

FIG. 1 is a diagram showing the states of a conventional HMM, and indicates that a single phonetic element has three states 11, 12 and 13.

In this case, a transition from each state to another state is made. These transitions are determined based on probability, and only state transition from the left to the right (in FIG. 1) is allowed. For example, a transition from a state (S1) 11 to a state (S2) 12 can be made or the state (S1) 11 can be restored, according to input conditions (S2) 12.

The HMM states are a plurality of states when a single phonetic element of an input voice signal is divided into the plurality of states, and may be classified into stable states and unstable states. In this case, when the single phonetic element, as shown in FIG. 1, is divided into the three states 11, 12 and 13, the first state 11 is an unstable state, the second state 12 is a stable state, and the third state 13 is an unstable state.

That is, both the first and third states 11 and 13 are unstable states because the first state 11 is affected by the previous state thereof and the third state 13 is affected by the subsequent state thereof, and the second state 12 is a stable state because it is almost completely unaffected by the first and third states 11 and 13.

When a single phonetic element is divided into a plurality of states in practice, the recognition rate varies according to the design of a transition structure. Dividing each phonetic element into a higher number of states is beneficial in terms of increasing the recognition rate, but there is a limitation in artificially manipulating the number of states, so a single phonetic element is generally represented using three divided states.

FIG. 2 is a diagram showing a word search network using the conventional HMM and a process of tracing an optimized word according to an input voice signal. In the network, figures described in respective nodes are indices that represent HMM states.

Such a word search network is optimized by taking the phonetic, lexical features of a recognition target word into account, so that it is called a lexical tree 20.

The optimized path of feature vectors extracted from an arbitrary input voice signal is searched for in the word search network. In this case, the traveling direction thereof may be determined based on probability.

In this case, a probability value for determining the traveling direction can be extracted from a probability distribution for each state. That is, branchable nodes are detected in the word search network, and the probability values of HMM states corresponding to the detected nodes are calculated. Of the nodes, the node having the largest value is determined to be a node to which traveling is directed.

Japanese Unexamined Pat. No. 2001-125589 disclosed a voice recognition apparatus that generates the acoustic model of a single Gaussian distribution using a speaker's voice data and a learning algorithm, and performs conversion on an HMM model so as to reduce the number of branches in each state. However, the disclosed apparatus uses only a single Gaussian distribution, so that the processing speed can be improved, but there is no a provision for the decrease in the recognition rate.

Accordingly, a voice recognition technology that can improve both processing speed and a recognition rate is needed.

BRIEF SUMMARY

An aspect of the present invention provides an apparatus and method for recognizing voice, which calculate scores for HMM states that represent feature parameters for each predetermined phonetic unit, using single waveform probability distributions and recalculate only scores for HMM states, having high scores, using multiple waveform probability distributions.

An aspect of the present invention provides an apparatus for recognizing voice, including a feature vector extraction unit dividing an input voice signal into predetermined unit regions, and extracting feature vectors corresponding to each of the unit regions; a predicted node extraction unit extracting a list of second nodes whose travels to a first node corresponding to the extracted feature vectors are predicted, with reference to a network of one or more nodes; a single waveform similarity calculation unit calculating degrees of single waveform similarity of the first node and the second nodes of the list by substituting the extracted feature vectors into single waveform probability distributions that constitute voice signals corresponding to the second nodes; a multiple waveform similarity calculation unit calculating degrees of multiple waveform similarity by substituting the extracted feature vectors into multiple waveform probability distributions that constitute single waveform probability distributions usable to calculate the degrees of single waveform similarity in a preset range; and an output unit outputting a function-performing signal corresponding to a multiple waveform probability distribution that enables calculation of a highest of the calculated degrees of multiple waveform similarity.

In addition, an aspect of the present invention provides a method of recognizing voice, including dividing an input voice signal into predetermined unit regions, and extracting feature vectors corresponding to each of the unit regions; extracting a list of second nodes whose travels to a first node corresponding to the extracted feature vectors are predicted, with reference to a network of one or more nodes; calculating degrees of single waveform similarity of the first node and the second nodes of the list by substituting the extracted feature vectors into single waveform probability distributions that constitute voice signals corresponding to the second nodes; calculating degrees of multiple waveform similarity by substituting the extracted feature vectors into multiple waveform probability distributions that constitute single waveform probability distributions usable to calculate the degrees of single waveform similarity in a preset range; and outputting a function-performing signal corresponding to a multiple waveform probability distribution that enables calculation of a highest of the calculated degrees of multiple waveform similarity.

Another aspect of the present invention provides an apparatus for recognizing voice, including: a predicted node extraction unit which extracts a list of second nodes whose travels to a first node corresponding to extracted feature vectors are predicted, with reference to a network of at least one node, the extracted feature vectors being pieces of information about voice frequencies and respectively corresponding to unit regions of an input voice signal; a single waveform similarity calculation unit which calculates degrees of single waveform similarity of the first node and the second nodes of the list by substituting the extracted feature vectors into single waveform probability distributions that constitute voice signals corresponding to the second nodes; a multiple waveform similarity calculation unit which calculates degrees of multiple waveform similarity by substituting the extracted feature vectors into multiple waveform probability distributions that constitute single waveform probability distributions and are usable to calculate degrees of single waveform similarity in a range; and an output unit outputting a function-performing signal corresponding to a selected one of the multiple waveform probability distributions which results in a highest calculated degree of multiple waveform similarity.

Still another aspect of the present invention provides a computer-readable storage medium encoded with processing instructions for causing a processor to execute the aforementioned method.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 7 is a flowchart illustrating an example of a process of generating probability distributions according to an embodiment of the present invention;

FIG. 8 is a table showing experimental results for the groups according to an embodiment of the present invention.

DETAILED DESCRIPTION OF EMBODIMENTS

Figure 1:
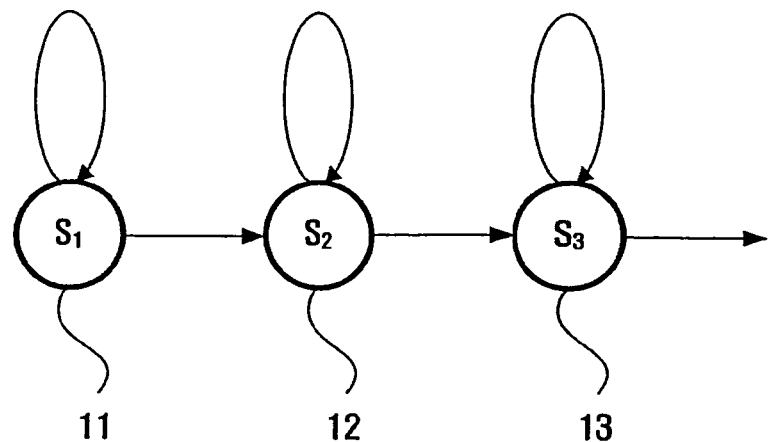
FIG. 1 is a diagram showing the states of a conventional HMM.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
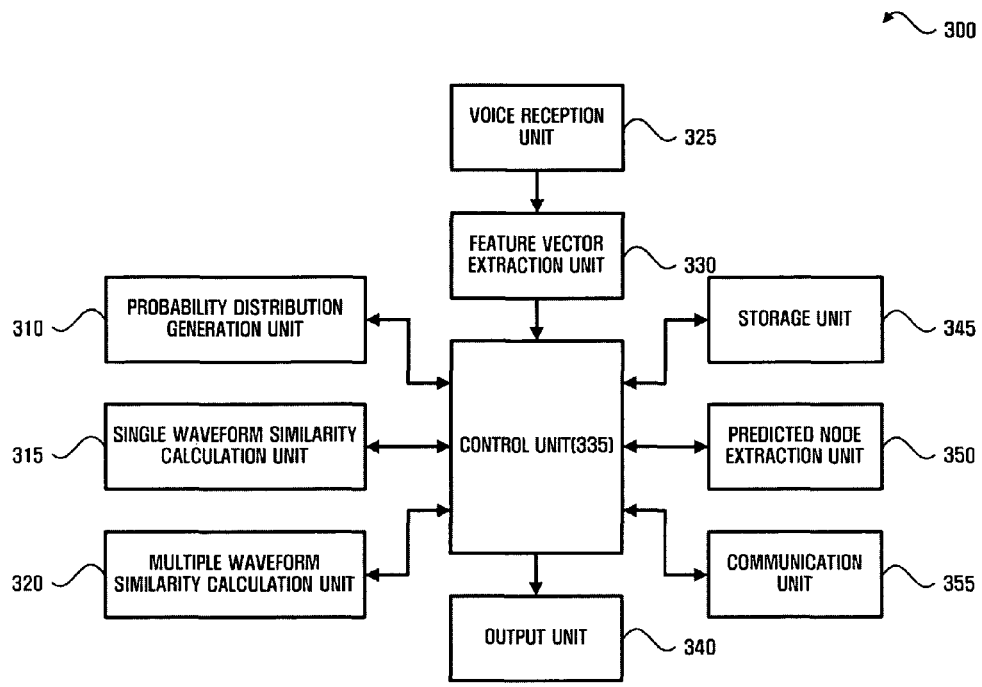
FIG. 3 is a block diagram showing the construction of an apparatus for recognizing voice according to an embodiment of the present invention.

FIG. 3 is a block diagram showing the construction of an apparatus for recognizing voice according to an embodiment of the present invention. The voice recognition apparatus 300 includes a storage unit 345, a predicted node extraction unit 350, a voice reception unit 325, a feature vector extraction unit 330, a probability distribution generation unit 310, a control unit 335, an output unit 340, a single waveform similarity calculation unit 315, a multiple waveform similarity calculation unit 320, and a communication unit 355.

The storage unit 345 stores function-performing signals and feature vectors, which correspond to the respective nodes of a network. In this case, the nodes have probability values indicating whether transitions to subsequent nodes on a time axis will be made, and includes HMM States. Hereinafter, the term 'node' describes an HMM state. Meanwhile, the network includes a hierarchical structure of nodes achieving a predetermined voice signal via irreversible traveling. Furthermore, the network includes a lexical tree because specific words are implemented through the traveling paths of nodes constituting the network.

Only unique numbers are assigned to the respective nodes included in the network, and information about probability values corresponding to actual nodes may be separately stored. Accordingly, when the network is referenced, the unique numbers of the nodes are referenced and information about nodes corresponding to the unique numbers may be separately extracted.

The function-performing signals include signals for performing one or more functions selected from among functions provided in the voice recognition apparatus 300 in advance, and functions generated by a user.

For example, when the voice recognition apparatus 300 is a mobile phone, function-performing signals for performing functions, such as menu display, directory display and speed dialing, which are provided in the voice recognition apparatus 300 in advance, may be stored in the storage unit 345, and function-performing signals that are acquired by combining a plurality of functions provided in the voice recognition apparatus 300 and are generated by the user may be stored in the storage unit 345. The function-performing signals that are acquired by combining the plurality of functions may be combinations of the function-performing signals for the respective functions.

The feature vectors are pieces of information about voice frequencies extracted by the feature vector extraction unit 330, and are used to perform single waveform probability distribution scoring or multiple waveform probability distribution scoring.

Non-limiting examples of the storage unit 345 include a hard disk, flash memory, a Compact Flash (CF) card, a Secure Digital (SD) card, a Smart Media (SM) card, a Multimedia Card (MMC) or a memory stick, to or from which information can be respectively input or output, and may be provided in the voice recognition apparatus 300 or in a separate apparatus.

The voice reception unit 325 receives a voice signal, that is, it converts voice acoustical energy into electrical energy. A microphone may be used as the voice reception unit 325.

Accordingly, the voice reception unit 325 may convert the input voice signal into electric energy using, by way of non-limiting examples, an electric resistance variation type scheme that varies electric resistance using sound pressure, a piezoelectric type scheme that varies voltage using sound pressure based on a piezoelectric effect, a magnetic variation type scheme that generates voltage according to the vibration of a thin piece of metal foil and, thereby, varies magnetic force, a dynamic type scheme that disposes actuation coils around a cylindrical magnet and operates the coils using a vibration plate, thereby using current generated by the coil, and a capacitance type scheme that forms a condenser by disposing a vibration plate made of a piece of metal foil to face a fixed electrode, and varies the capacitance of the condenser while the vibration plate vibrates in response to sound. The voice signal obtained by the conversion into the electric energy is transmitted to the feature vector extraction unit 330.

The feature vector extraction unit 330 extracts feature vectors included in the voice signal. For this purpose, the feature vector extraction unit 330 may include an analog-to-digital converter for converting an analog voice signal into a digital voice signal. The digital voice signal obtained by the conversion may be divided at intervals of about 10 ms.

Furthermore, the feature vector extraction unit 330 extracts the feature vectors of the divided digital voice signals. By way of non-limiting examples, the feature vector extraction unit 330 may extract the features of the digital voice signals using at least one method selected from among a Linear Predictive Coding (LPC) method, a LPC derived Cepstrum method, a Perceptive Linear Prediction (PLP) method, an audio model feature extraction method, and a Mel-Frequency Cepstrum Coefficients (MFCC) feature extraction method. The extracted feature vectors are transferred to the control unit 335.

The control unit 335 determines whether the transferred feature vectors are feature vectors for searching for information or for storing information. That is, the user may search for information that is stored in the voice recognition apparatus 300, or make searches for the performance of functions, or may store new voice information, using input means, such as, by way of a non-limiting example, buttons, that are provided in the voice recognition apparatus 300. In this case, the control unit 335 determines whether the transferred feature vectors are feature vectors for searching for information or for storing information, according to the user's command, input through the input means.

If it is determined that the transferred feature vectors are feature vectors learned to store the information, the control unit 335 enables the probability distribution generation unit 310 to generate probability distributions corresponding to unit regions. In this case, the probability distributions may be Gaussian distributions each of which is constituted by a mean and a variance for the voice signal of a corresponding unit region. Furthermore, one or more Gaussian distributions may be used for a single unit region. A detailed description of the generation of the probability distributions is described later with reference to FIG. 4.

Furthermore, the control unit 335 inserts the generated probability distributions into the network stored in the storage unit 345 and then completes learning for the input voice signal. That is, a new node is generated and is then inserted into the network, or the arrangement of existing nodes is changed.

Meanwhile, if it is determined that the transferred feature vectors are feature vectors for searching for the information or for search for the performance of a function, the control unit 315 transfers the extracted feature vectors to the predicted node extraction unit 350.

Figure 2:
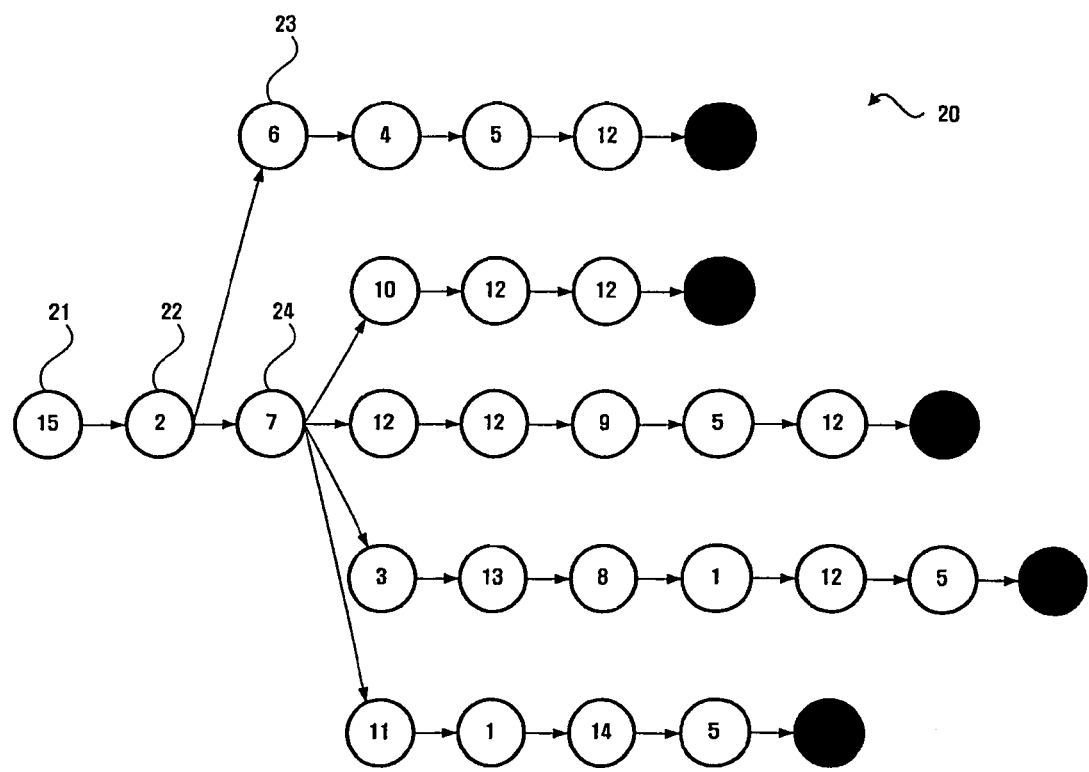
FIG. 2 is a diagram showing a word search network using the conventional HMM.

Accordingly, the predicted node extraction unit 350 extracts a list of nodes (hereinafter referred to as second nodes) whose travel to nodes (hereinafter referred to as a first node) corresponding to the transferred feature vectors with reference to the network stored in the storage unit 345. In other words, the extraction of a list of second nodes, which are connected to the current second node of the network and whose travels are possible, is performed. A description of the extraction is given with reference to FIG. 2. When the unique number of the current second node is 2 (22), nodes connected to the #2 node (22) are node #s 15, 6 and 7 (respectively 21, 23 and 24). Nodes to which travel is possible from the #2 node (22) are the #s 6 and 7 nodes (respectively 23 and 24), so that the second nodes 23 and 24 corresponding to #s 6 and 7 nodes can be extracted.

That is, the predicted node extraction unit 350 extracts the unique numbers of the second nodes included on the list. The list, including the second nodes, is transferred to the single waveform similarity calculation unit 315.

The single waveform similarity calculation unit 315 calculates the degrees of single waveform similarity of the first node and the second nodes of the list by substituting the transferred feature vectors into single waveform probability distributions that constitute voice signals corresponding to the second nodes.

In this case, the single waveform probability distributions may be Gaussian distributions that are obtained by grouping the single waveform probability distributions, which constitute the voice signals corresponding to the second nodes, according to the degree of similarity, and expressing each probability distribution group using a representative single waveform. Further, the single waveform probability distributions may be Gaussian distributions that express probability distributions, which constitute the voice signals corresponding to the second nodes and in each of which one or more waveforms are mixed, using single waveforms.

The grouping of the second nodes and the generating of a single waveform that represents the grouped second node are performed by the probability distribution generation unit 310, detailed descriptions of which are made later with reference to FIG. 4.

The results of comparison for the degrees of similarity for the single waveform probability distributions are transferred to the multiple waveform similarity calculation unit 320. In this case, the multiple waveform similarity calculation unit 320 calculates the degree of multiple waveform similarity by substituting the transferred feature vectors to multiple waveform probability distributions that constitutes single waveform probability distributions that enable the calculation of the degrees of single waveform similarity that belong to degrees of single waveform similarity calculated by the single waveform similarity calculation unit 315 and are included in a preset range.

In this case, the multiple waveform probability distributions may Gaussian distributions, which constitute the voice signals corresponding to the second nodes and in each of which one or more mixed waveforms are mixed.

The single waveform similarity calculation unit 315 searches for network paths with respect to the input voice signals using the single waveform probability distributions that represent the second node groups based on the degree of similarity, so that the search for the network path can be performed with a relatively small number of operations, in contrast to the use of the single waveform probability distributions that respectively correspond to the second nodes.

For example, when the single waveform probability distributions, which respectively correspond to the second nodes, are used when the number of second nodes constituting the network is 2000, a maximum number of operations of 2000 must be performed with respect to the input voice signal. However, when the second nodes are grouped into 100 groups and single waveform probability distributions representing the groups are used, searching for paths can be performed with a maximum number of operations of only 100.

In this case, the margin of error may increase in direct proportion to the number of the searching for paths performed using the single waveform probability distributions that represent the groups. In order to compensate for the margin of the error, the multiple waveform similarity calculation unit 320 compares the degrees of similarity for multiple waveform probability distributions corresponding to selected second nodes, which belong to the results of comparison of the single waveform similarity calculation unit 315. That is, the multiple waveform similarity calculation unit 320 performs precise searching with respect to the input voice signal.

As a result, the present embodiment can reduce the number of operations and the response time by performing approximate searching using the single waveform similarity calculation unit 315, and can compensate for the error by performing precise searching using the multiple waveform similarity calculation unit 320.

The results of comparison of the multiple waveform similarity calculation unit 320 are transferred to the control unit 335, and the control unit 335 enables the output unit 340 to output a function-performing signal that corresponds to a second node having the highest degree of similarity. Accordingly, the voice recognition apparatus 300 performs the corresponding function or outputs specific information.

Meanwhile, the number of single waveform probability distributions, which enable the calculation of the degrees of single waveform similarity, which belong to the degrees of single waveform similarity calculated by the single waveform similarity calculation unit 315 and are included in the preset range, may exceed a predetermined threshold value. In this case, the control unit 335 enables the communication unit 355 to transmit the transferred feature vectors to a separate large volume voice recognition apparatus (not shown).

Accordingly, the large volume voice recognition apparatus receives the feature vectors and calculates the degrees of multiple waveform similarity using the received information, and transmits the calculated degree of multiple waveform similarity.

Furthermore, the communication unit 355 receives the degree of similarity for a multiple waveform from the large volume voice recognition apparatus and transfers it to the control unit 335. As a result, the control unit 335 enables the output unit 340 to output a corresponding function-performing signal using voice recognition results calculated by the large volume voice recognition apparatus, not by the multiple waveform similarity calculation unit 320.

Accordingly, such an operation is performed by the voice recognition apparatus 300 only when the number of operations for calculating the degrees of multiple waveform similarity is small, and is performed by the large volume voice recognition apparatus when the number of operations is large, so that the number of operations of the voice recognition apparatus 300 can be reduced.

Furthermore, when the communication unit 355 is not provided in the voice recognition apparatus 300, or the large volume voice recognition apparatus, which can rapidly detect the voice recognition results, does not exist when the number of single waveform probability distributions, which enable the calculation of the degrees of single waveform similarity that belong to the degrees of single waveform similarity calculated by the single waveform similarity calculation unit 315 and are included in the preset range, exceeds a predetermined threshold value, the control unit 335 may enable an error message to be output through the output unit 340. In this case, the threshold value may be exceeded because the input voice signal is an unregistered word, so that the error message may be a message for providing notification of the fact that the input voice signal is an unregistered word.

The communication methods using the communication unit 355 may employ a wired communication method, such as, by way of non-limiting examples, an Ethernet, a Universal Serial Bus (USB), an Institute of Electrical and Electronics Engineers (IEEE) 1394, serial communication or parallel communication, and may employ a wireless communication method, such as, by way of non-limiting examples, infrared communication, Bluetooth, home Radio Frequency (RF), or wireless Local Area Network (LAN).

The control unit 335 performs overall control of the storage unit 345, the predicted node extraction unit 350, the voice reception unit 325, the voice unit extraction unit 335, the feature vector extraction unit 330, the probability distribution generation unit 310, the output unit 340, the single waveform similarity calculation unit 315, the multiple waveform similarity calculation unit 320, the communication unit 355, and the voice recognition apparatus 300.

Figure 4:
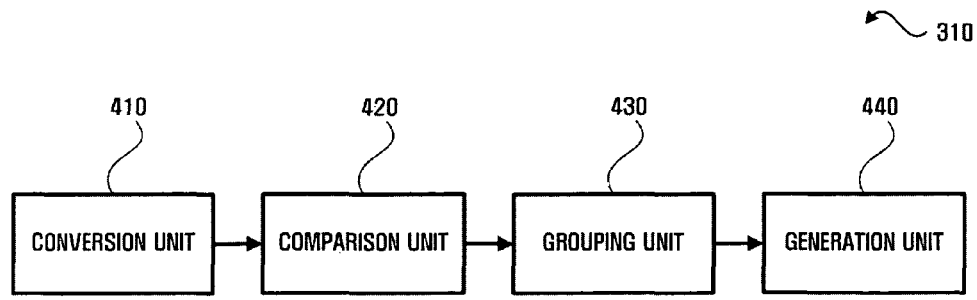
FIG. 4 is a block diagram showing an example of the construction of a probability distribution generation unit according to an embodiment of the present invention in detail.

FIG. 4 is a block diagram showing the construction of the probability distribution generation unit 310 according to an example of the present embodiment. The probability distribution generation unit 310 includes a conversion unit 410, a comparison unit 420, a grouping unit 430, and a generation unit 440.

The probability distribution generation unit 310 generates the HMMs of previously defined phonetic elements, to be used for voice recognition, and multiple waveform probability distributions possessed by the states thereof, group the second nodes, and generate a single waveform that represents each second node group. For this purpose, the probability distribution generation unit 310 generates probability distributions for the respective second nodes. In this case, the probability distributions may be Gaussian distributions each of which is constituted by a mean and a variance for voice signals corresponding to the second nodes, and one or more Gaussian distributions may be used for each second node. Accordingly, probability distributions corresponding to the second nodes may correspond to the HMMs of a previously defined phonetic element, to be used for voice recognition, and the states thereof.

The conversion unit 410 converts multiple waveform probability distributions, which constitute the voice signals corresponding to the second nodes and in each of which one or more waveforms are mixed, into single waveform probability distributions.

A predetermined region of voice signal, corresponding to each second node, may constitute a probability distribution, in which one or more waveforms are mixed, to model speaker change, environmental change, etc. The conversion unit 410 converts the probability distributions, in each of which one or more mixed waveforms, into single waveform probability distributions. In this case, the probability distributions may include Gaussian distributions.

The single waveform probability distributions obtained by the conversion are configured to correspond to the respective second nodes constituting the network and are then stored in the storage unit 345.

The comparison unit 420 may compare the degrees of similarity for the single waveform probability distributions, which are obtained by the conversion and are configured to correspond to the respective second nodes. That is, the comparison unit 420 performs comparison on the means and variances of the respective single waveform probability distributions, and may also perform comparison on the means and variances of the multiple waveform probability distributions corresponding to the respective nodes.

For example, the degrees of similarity between the two single waveform probability distributions are compared, and the result of the comparison may expressed by the following Equation 1 when the distributions thereof are Gaussian distributions.

$$D_{Bhat} = \frac{1}{8}(\mu_2 - \mu_1)^T \left[\frac{\sum_1 + \sum_2}{2}\right]^{-1} (\mu_2 - \mu_1) + \frac{1}{2}\ln\frac{\left|\frac{\sum_1 + \sum_2}{2}\right|}{\sqrt{|\sum_1||\sum_2|}} \quad (1)$$

Here, μ is the mean vector of a single waveform probability distribution, and Σ is a covariance matrix.

For reference, a value calculated using Equation 1 is obtained from the difference between the two single waveform probability distributions. The comparison unit 420 finds the pair of waveform probability distributions of which the value obtained by the calculation is small.

The result of the comparison is transferred to the grouping unit 430, and the grouping unit 430 groups the second nodes according to the comparison result. That is, the second nodes are grouped for single waveform probability distributions having similar mean and variance values.

In this case, the grouping unit 430 may form a preset number of groups or may form groups including a preset number of single waveform probability distributions. That is, a specific number of groups including an arbitrary number of single waveform probability distributions, or an arbitrary number of groups including a specific number of single waveform probability distributions, may be formed.

For example, when the number of single waveform probability distributions is 1000 and the number of set groups is 10, the grouping unit 430 forms 10 groups including 89, 111, 130, 56, 140, 115, 102, 74, 86 and 97 single waveform probability distributions (89+111+130+56+140+115+102+74+86+97=1000).

When the groups are formed through the above process, the generation unit 440 generates single waveform probability distributions that represent second node groups. That is, a representative single waveform probability distribution is formed. For this purpose, the generation unit 440 may perform a task similar to that of the conversion unit 410. In other words, multiple waveform probability distributions are converted into single waveform probability distributions, and the single waveform probability distributions for which the means and variances of the multiple waveform probability distributions are taken into account are generated.

Figure 5:
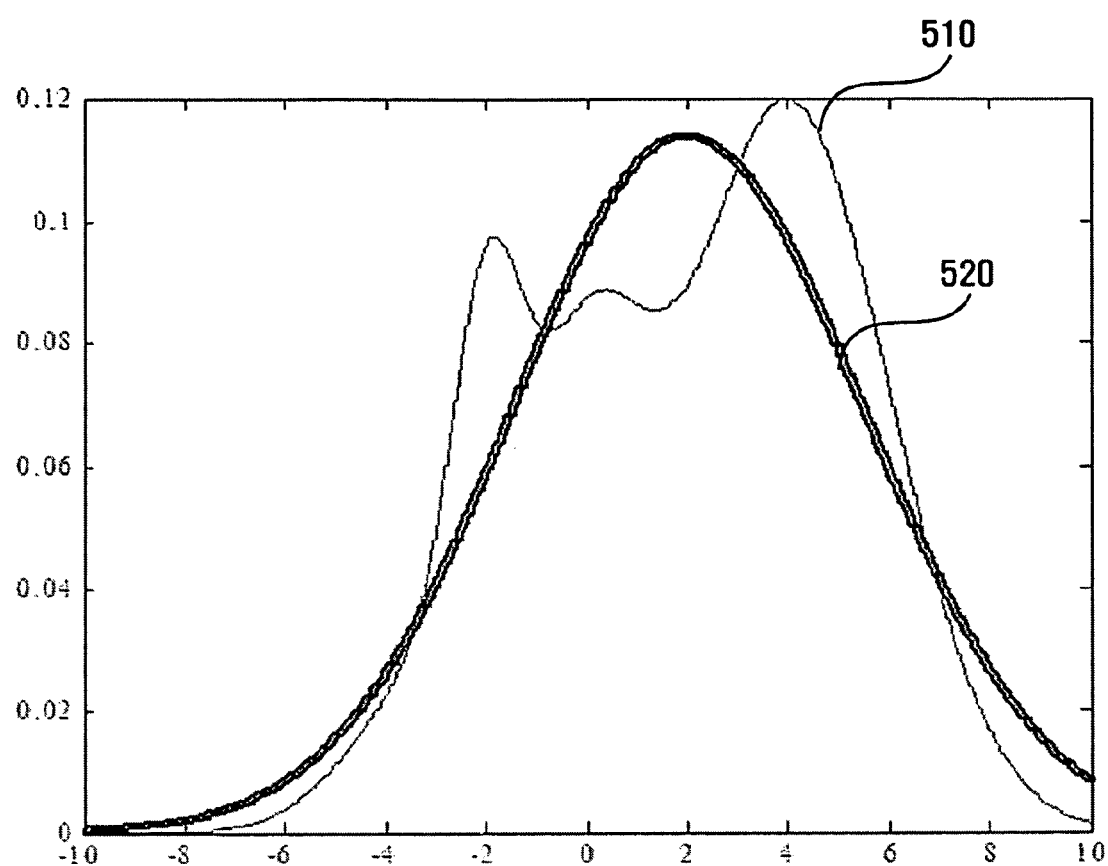
FIG. 5 is diagram showing an example of converting a multiple waveform probability distribution into a single probability distribution according to an embodiment of the present invention.

FIG. 5 is a diagram showing an example of converting a multiple waveform probability distribution into a single probability distribution according to an embodiment of the present invention.

As described above, the probability distributions of the feature vectors for voice recognition may be formed using a plurality of waveforms, and each waveform may be expressed by a probability distribution, such as a Gaussian distribution. In this case, operation for all of the multiple waveform probability distributions increases the accuracy of voice recognition, but results in decreased operation speed due to the excessive number of operations. Accordingly, the present invention converts multiple waveform probability distributions into single waveform probability distributions, and performs operation using the single waveform probability distributions obtained by the conversion.

FIG. 5 shows an example of converting a multiple waveform probability distribution into a single waveform probability distribution. In FIG. 5, a thin curve and a thick curve respectively indicate the multiple waveform probability distribution 510 and the single waveform probability distribution 520, respectively.

The conversion of the multiple waveform probability distribution 510 into the single waveform probability distribution 520 may be expressed by the following Equation 2 when the distribution thereof is a Gaussian distribution.

$$N(\mu_s, \sigma_s) \cong \sum_{k=1}^{M} w_k N(\mu_k, \sigma_k) \quad (2)$$

Here, $N(\mu_s,\sigma_s)$ is the single waveform probability distribution 520 and $N(\mu_k,\sigma_k)$ is the multiple waveform probability distribution 510. Furthermore, μ and σ indicate a mean and a variance, respectively, w indicates the weight of each single wave probability distribution included in the multiple waveform probability distribution 510, and M indicates the number of single wave probability distributions included in the multiple waveform probability distribution 510.

In this case, when a probability distribution is a Gaussian distribution, a method of approximating a multiple waveform probability distribution having M single waveforms to a single waveform probability distribution can be expressed by the following Equations 3 and 4, which is described later. $\mu_s$ and $\sigma_s$ are the mean and variance of the approximated single waveform probability distribution. T is the total number samples for which the multiple waveform probability distribution is estimated, $w_k$ is a ratio occupied by the kth single waveform probability distribution in a multiple waveform probability distribution, and $x_{k,q}$ is a qth sample used for generating the kth single waveform probability distribution in the multiple waveform probability distribution.

$$\mu_s = \frac{\sum_{k=1}^{T}\sum_{q=1}^{w_kT} x_{k,q}}{T} \quad (3)$$

$$= \frac{\sum_{k=1}^{M}\left(w_kT \cdot \frac{1}{w_kT}\sum_{q=1}^{w_kT} x_{k,q}\right)}{T}$$

$$= \frac{\sum_{k=1}^{M}(w_kT \cdot \mu_k)}{T}$$

$$= \sum_{k=1}^{M}(w_k \mu_k)$$

$$\alpha_s^2 = \frac{\sum_{k=1}^{M}\sum_{q=1}^{w_kT}(x_{k,q}-\mu_s)^2}{T} \quad (4)$$

$$= \frac{\sum_{k=1}^{M}\left(w_kT \cdot \frac{1}{w_kT}\sum_{q=1}^{w_kT}(x_{k,q}-\mu_s)^2\right)}{T}$$

$$= \sum_{k=1}^{M}(w_k(\sigma_{k_2}+\mu_k^2-\mu_k\mu_s-\mu_s^2))$$

Meanwhile, when the feature vectors are composed of the Cepstrum coefficients, which are widely used for the recognition of voice, correlation between respective dimensions can be ignored, so that mean and variance values for each dimension can be estimated from the above equations.

For reference, the generation unit 440 of the probability distribution generation unit 310 performs a task similar to that of the conversion unit 410. In order to generate a single waveform probability distributions that represents each group, a weight w is substituted into 1/(the number of single waveform probability distributions included a group), therefore the single waveform probability distribution can be generated.

Figure 6:
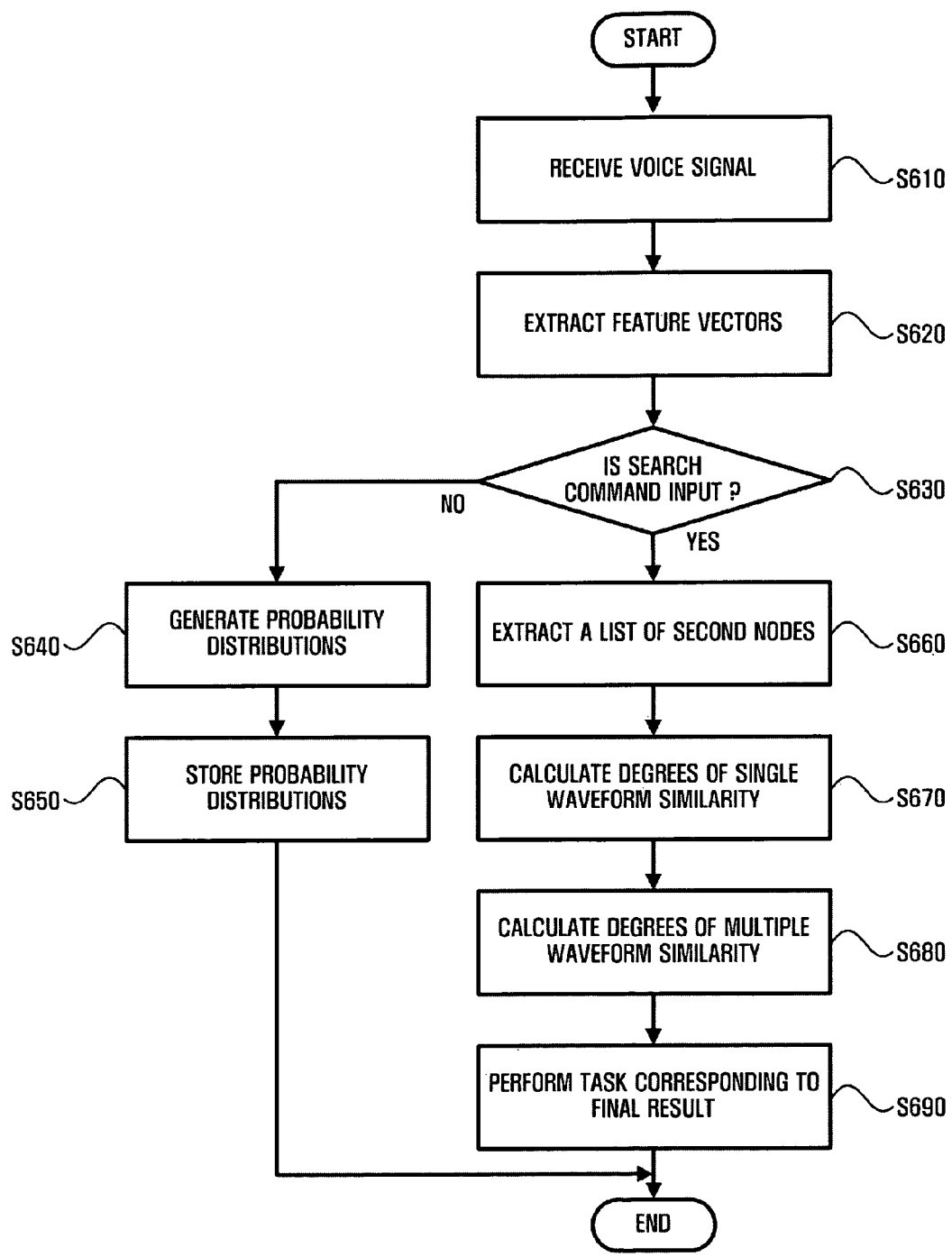
FIG. 6 is a flowchart illustrating a process of recognizing voice according to an embodiment of the present invention.

FIG. 6 is a flowchart illustrating a process of recognizing voice according to an embodiment of the present invention. For ease of explanation only, this process is described with reference to the apparatus of FIG. 3. However, it is to be understood that this process can be executed by other apparatuses of both similar and dissimilar configurations to that of FIG. 3.

First, the voice reception unit 325 receives a voice signal to recognize voice at operation S610. The voice signal may be received through a reception means, such as a microphone. The microphone converts input acoustical energy into electrical energy.

Accordingly, the feature vector extraction unit 330 extracts feature vectors included in the voice signal obtained by the conversion into electrical energy, at operation S620. That is, an analog voice signal is converted into a digital voice signal, the voice signal obtained by the conversion is divided at predetermined intervals, and then the features of the voice signals obtained by the division are extracted.

The control unit 335 examines an input user command at operation S630 and determines whether the extracted feature vectors are feature vectors that are searched for or learned.

Thereafter, if a determination that feature vectors are learned feature vectors is made (i.e., it is determined that the input user command is not a search command), the probability distribution generation unit 310 generates probability distributions for the predetermined regions of the voice signals at operation S640. In this case, the probability distributions may be Gaussian distributions each of which is constituted by a mean and a variance for the voice signal of a corresponding region, and one or more Gaussian distributions may correspond to a single region.

Furthermore, the control unit 335 stores the generated probability distributions in the storage unit 345 and completes the learning of the predetermined regions of the voice signal input at operation S650. Then the process ends.

Meanwhile, if it is determined that the input user command is a search command, the predicted node extraction unit 350 extracts a list of second nodes whose travels to the first node corresponding to the transferred feature vectors are predicted, with reference to the network stored in the storage unit 345 at operation S660.

The extracted list of second nodes is transferred to the single waveform similarity calculation unit 315, and the single waveform similarity calculation unit 315 substitutes the transferred feature vectors into single waveform probability distributions, which constitutes voice signals corresponding to the second nodes, and calculates the degrees of single waveform similarity of the first node and the second nodes included in the list, at operation S670. The calculation of the degrees of single waveform similarity may be performed by applying Equation 1 when the distributions thereof are Gaussian distributions.

In this case, the single waveform probability distributions may be Gaussian distributions each of which obtained by grouping single waveform probability distributions, which constitute voice signals corresponding to the second nodes, according to the degree of similarity, and expressing each probability distribution using a representative single waveform. In this case, the single waveform probability distributions may be Gaussian distributions that express probability distributions, which constitute the voice signals corresponding to the second nodes and in each of which one or more waveform are mixed, using single waveforms.

The results of comparison of the degrees of similarity for the single waveform probability distributions are transferred to the multiple waveform similarity calculation unit 320, and the multiple waveform similarity calculation unit 320 calculates the degrees of multiple waveform similarity by substituting the transferred feature vectors into the multiple waveform probability distributions, which constitutes single waveform probability distributions that enable the calculation of the degrees of single waveform similarity, which belong to degrees of single waveform similarity calculated by the single waveform similarity calculation unit 315 and are included in the preset range, at operation S680.

Meanwhile, the number of single waveform probability distributions, which enable the calculation of the degrees of single waveform similarity that belong to the degrees of similarity for a single waveform calculated by the single waveform similarity calculation unit 315 and are included in a present range, may exceed a predetermined threshold value. In this case, the control unit 335 may enable the communication unit 355 to transmit the transferred feature vectors, and the multiple waveform probability distributions that constitutes the single waveforms probability distributions that enable calculation of the degree of single waveform similarity included in the preset range, or may enable the output unit 340 to output an error message.

The separate large volume voice recognition apparatus (not shown) that has received the feature vectors detects the feature vectors and a word having the highest similarity from a separate word search network and transmits it to the communication unit 355.

Furthermore, the word detected by the large volume voice recognition apparatus is received by the communication unit 355 and is then transferred to the control unit 335.

Furthermore, the threshold value may be exceeded because the input voice signal is an unregistered word, so that the error message may be a message for providing notification of the fact that the input voice signal is an unregistered word.

The results of comparison of the degrees of similarity for the multiple waveform probability distributions are transferred to the control unit 335. The control unit 335 temporarily stores the second nodes corresponding to the transferred comparison results, connects the extracted second nodes by repeating the above-described process, completes the searching of the paths of the network, and then enables the output unit 340 to output a function-performing signal corresponding to voice information for which searching is completed. Accordingly, the voice recognition apparatus 300 performs a task corresponding to a final result at operation S690. That is, the corresponding functions based on voice recognition are performed, or specific information is output. Then the process ends.

FIG. 7 is a flowchart illustrating a process of generating probability distributions according to an example of the present embodiment. For ease of explanation only, this process is described with concurrent reference to the apparatus of FIGS. 3 and 6. However, it is to be understood that this process can be executed by apparatuses of both similar or dissimilar configurations to that of FIG. 3.

The voice recognition apparatus 300 groups the second nodes, which constitute the network, according to the degree of similarity therebetween, and generates single waveform probability distribution that represent respective groups.

For this purpose, the conversion unit 410 converts multiple waveform probability distributions, which constitute the voice signals corresponding to the second nodes and in which one or more waveforms are mixed, into single waveform probability distributions at operation S710. The conversion into the single waveform probability distributions may be performed using Equations 2 and 4 when the distributions thereof are Gaussian distributions.

Thereafter, the comparison unit 420 may perform comparison on the degrees of similarity of the single waveform probability distributions that correspond to the respective second nodes and are obtained by the conversion, at operation 720. That is, the comparison unit 420 performs comparison on the means and variances of the respective single waveform probability distributions, and may also perform comparison on the means and variances of the multiple waveform probability distributions that correspond to the respective nodes. The comparison of the degrees of similarity for the single waveform probability distributions may be performed using Equation 1 when the distributions thereof are Gaussian distributions.

Furthermore, the grouping unit 430 groups the second nodes according to the results of comparison of the degrees of similarity at operation S730. In this case, the grouping may form a predetermined number of groups or may form groups including a predetermined number of single waveform probability distributions.

Thereafter, the generation unit 440 generates single waveform probability distributions, which represent second node groups, at operation S740. That is, in order to generate the single waveform probability distributions, the voice recognition apparatus 300 may use Equation 1 when the distributions thereof are Gaussian distributions.

The voice recognition apparatus 300 stores the generated single waveform probability distributions, and uses the single waveform probability distributions to analyze the predetermined regions of a subsequent input voice signal.

FIG. 8 shows tables 810, 820 and 830 showing experimental results for groups according to an embodiment of the present invention, and shows the results of voice recognition obtained when the second nodes, the number of which is respectively 64, 88 and 128, are generated.

The respective second nodes constituting the network were formed according to the following environmental factors.

A learned and stored database is constructed using 63982 numbers of isolated words that are formed by a total number of 157 men and women. In the case of the Korean language, the isolated words include points of interest, place names, and persons' names.

A signal-to-Noise Ratio (SNR) is above 20 dB, and noise environments were not taken into account.

The 39th order feature vectors were used. The feature vectors include fundamental components (12th order Cepstrum coefficients plus 1 log energy coefficient), and their speed and acceleration coefficients.

Learning was performed using 1000 numbers of Gaussian probability distributions, which can share Triphone HMMs, capable of being generated in the Korean language, and the states thereof, and the results of the learning were used. The total number of Gaussian distributions for each probability distribution was 8.

In the tables 810, 820 and 830, the range of scores 850 includes numbers arbitrarily set to select a target for comparing the degrees of similarity for multiple waveform probability distributions from among the results of comparison of the degrees of similarity for single waveform probability distributions, and is used to perform comparison on the degrees of similarity for multiple waveform probability distributions only for targets having scores in the range of scores 850, which is specified in the table based on the highest score of the results of comparison of the degrees of similarity for single waveform probability distributions.

As specified in the tables 810, 820 and 830, it can be seen that the recognition rate increases in proportion to the increase of the range of scores 850. This is because the analysis of the degrees of similarity for the multiple waveform probability distributions is performed for relatively many targets. However, it can be seen that, when the analysis of the degrees of similarity for the multiple waveform probability distributions for many targets is performed, an increase in the operation time results.

Figure 9:
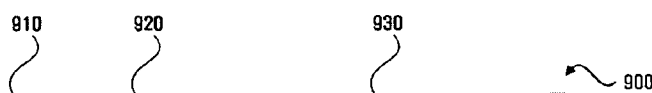
FIG. 9 is a table in which the experimental results according to the embodiment of the present invention and experimental results based on other algorithms are compared with each other.

FIG. 9 is a table in which the experimental results according to the embodiment of the present invention and experimental results based on other algorithms are compared with each other. As algorithms that are targets compared with the present embodiment, a Bucket Box Intersection (BBI) Gaussian selection algorithm 910 and a state selection algorithm using a Context Independent (CI) HMM 920 were used.

A table 900 shows a word error rate, the BBI Gaussian selection algorithm and the state selection algorithm by using CI HMM 920, which depends on a voice recognition rate, and response times depending on an algorithm 930 according to the present embodiment.

That is, as specified in the table 900, it can be seen that the response times depending on the algorithm 930 according to the present embodiment are smaller overall than response times that depend on the other algorithms 910 and 920. Furthermore, it can be seen that the case classified into 88 numbers of groups shows the highest efficiency.

According to the above-described embodiments of the present invention, scores for HMM states that represent feature parameters for each predetermined phonetic unit are calculated using single waveform probability distributions, and only scores for HMM states, having higher scores, are recalculated using multiple waveform probability distributions, so that processing speed can be improved without lowering the recognition rate.

Embodiments of the present invention include computer program products on which computer program instructions are stored. These computer program instructions can be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for recognizing voice, comprising:
   a feature vector extraction unit dividing an input voice signal into predetermined unit regions, and extracting feature vectors corresponding to each of the unit regions;
   a predicted node extraction unit extracting a list of second nodes whose travels to a first node corresponding to the extracted feature vectors are predicted, with reference to a network of one or more nodes;
   a probability distribution generation unit converting respective multiple waveform probability distributions, which constitute the voice signals corresponding to each of the second nodes, into single waveform probability distributions, grouping the single waveform probability distributions according to degree of similarity there between, and generating representative single waveform probability distributions that represent each probability distribution group;
   a single waveform similarity calculation unit calculating degrees of single waveform similarity of the first node and each probability distribution group by substituting the extracted feature vectors into the representative single waveform probability distributions;
   a multiple waveform similarity calculation unit calculating degrees of multiple waveform similarity by substituting the extracted feature vectors into each of the multiple waveform probability distributions that constitute the representative single waveform probability distributions usable to calculate the degrees of single waveform similarity in a preset range; and
   an output unit outputting a function-performing signal corresponding to a multiple waveform probability distribution that enables calculation of a highest of the calculated degrees of multiple waveform similarity only when a number of operations for calculating the degrees of the multiple waveform similarity is smaller than a preset threshold or outputting an unregistered word.

2. The apparatus of claim 1, wherein the nodes have probability values indicating whether transitions to subsequent nodes on a time axis will be made.

3. The apparatus of claim 2, wherein the first and second nodes have Hidden Markov Model (HMM) states.

4. The apparatus of claim 1, wherein the network comprises a hierarchical structure of second nodes achieving a predetermined voice signal via irreversible travel.

5. The apparatus of claim 4, wherein the network comprises a lexical tree.

6. The apparatus of claim 1, wherein the single waveform probability distributions comprise Gaussian distributions that express probability distributions, which constitute the voice signals corresponding to the second nodes and in each of which one or more waveforms are mixed, using single waveforms.

7. The apparatus of claim 1, wherein the probability distribution generation unit comprises:
   a conversion unit converting multiple waveform probability distributions, which constitute the voice signals corresponding to the second nodes, into single waveform probability distributions;
   a comparison unit comparing degrees of similarity of the single waveform probability distributions that correspond to the respective second node and are obtained by the conversion;
   a grouping unit grouping the single waveform probability distributions according to results of the comparison; and
   a generation unit generating representative single waveform probability distributions that represent the respective probability distribution groups.

8. The apparatus of claim 1, wherein the multiple waveform probability distributions comprises Gaussian distributions, which constitute the voice signals corresponding to the second nodes and in each which one or more waveform are mixed.

9. The apparatus of claim 1, further comprising a communication unit transmitting the feature vectors when a number of single waveform probability distributions exceeds a predetermined threshold value.

10. The apparatus of claim 9, wherein the output unit outputs the function-performing signal that corresponds to the multiple waveform probability distribution that enables the calculation of the highest of the degrees of multiple waveform similarity in response to the transmission.

11. The apparatus of claim 1, wherein the output unit outputs an error message when a number of single waveform probability distributions exceeds a predetermined threshold value.

12. A method of recognizing voice, comprising:
   dividing an input voice signal into predetermined unit regions, and extracting feature vectors corresponding to each of the unit regions;
   extracting a list of second nodes whose travels to a first node corresponding to the extracted feature vectors are predicted, with reference to a network of one or more nodes;

converting respective multiple waveform probability distributions, which constitute the voice signals corresponding to each of the second nodes, into single waveform probability distributions;

grouping the single waveform probability distributions according to degree of similarity there between, generating representative single waveform probability distributions that represent each probability distribution group;

calculating degrees of single waveform similarity of the first node and each probability distribution group by substituting the extracted feature vectors into the representative single waveform probability distributions;

calculating degrees of multiple waveform similarity by substituting the extracted feature vectors into each of the multiple waveform probability distributions that constitute the representative single waveform probability distributions usable to calculate the degrees of single waveform similarity in a preset range; and outputting a function-performing signal corresponding to a multiple waveform probability distribution that enables calculation of a highest of the calculated degrees of multiple waveform similarity only when a number of operations for calculating the degrees of the multiple waveform similarity is smaller than a preset threshold or outputting an unregistered word.

13. The method of claim 12, wherein the nodes have probability values indicating whether transitions to subsequent nodes on a time axis will be made.

14. The method of claim 13, wherein the first and second nodes have HMM states.

15. The method of claim 12, wherein the network comprises a hierarchical structure of second nodes achieving a predetermined voice signal via irreversible travel.

16. The method of claim 13, wherein the network comprises a lexical tree.

17. The method of claim 12, wherein the single waveform probability distributions comprise Gaussian distributions that express probability distributions, which constitute the voice signals corresponding to the second nodes and in each of which one or more waveforms are mixed, using single waveforms.

18. The method of claim 12, wherein the multiple waveform probability distributions comprises Gaussian distributions, which constitute the voice signals corresponding to the second nodes and in each of which one or more waveform are mixed.

19. The method of claim 12, further comprising transmitting the feature vectors when a number of single waveform probability distributions exceeds a predetermined threshold value.

20. The method of claim 19, wherein the outputting the function-performing signal comprises outputting the function-performing signal that corresponds to the multiple waveform probability distribution that enables the calculation of the highest of the degrees of multiple waveform similarity in response to the transmission.

21. The method of claim 12, wherein the outputting the function-performing signal comprises outputting an error message when a number of single waveform probability distributions exceeds a predetermined threshold value.

22. A computer-readable storage medium encoded with processing instructions for causing a processor to execute a method of recognizing voice, the method comprising:

dividing an input voice signal into predetermined unit regions, and extracting feature vectors corresponding to each of the unit regions;

extracting a list of second nodes whose travels to a first node corresponding to the extracted feature vectors are predicted, with reference to a network of one or more nodes;

converting respective multiple waveform probability distributions, which constitute the voice signals corresponding to each of the second nodes, into single waveform probability distributions;

grouping the single waveform probability distributions according to degree of similarity there between, generating representative single waveform probability distributions that represent each probability distribution group;

calculating degrees of single waveform similarity of the first node and each probability distribution group by substituting the extracted feature vectors into the representative single waveform probability distributions;

calculating degrees of multiple waveform similarity by substituting the extracted feature vectors into each of the multiple waveform probability distributions that constitute the representative single waveform probability distributions usable to calculate the degrees of single waveform similarity in a preset range; and outputting a function-performing signal corresponding to a multiple waveform probability distribution that enables calculation of a highest of the calculated degrees of multiple waveform similarity only when a number of operations for calculating the degrees of the multiple waveform similarity is smaller than a preset threshold or outputting an unregistered word.

23. An apparatus for recognizing voice, comprising:

a predicted node extraction unit which extracts a list of second nodes whose travels to a first node corresponding to extracted feature vectors are predicted, with reference to a network of at least one node, the extracted feature vectors being pieces of information about voice frequencies and respectively corresponding to unit regions of an input voice signal;

a probability distribution generation unit converting respective multiple waveform probability distributions, which constitute the voice signals corresponding to each of the second nodes, into single waveform probability distributions, grouping the single waveform probability distributions according to degree of similarity there between, and generating representative single waveform probability distributions that represent each probability distribution group;

a single waveform similarity calculation unit which calculates degrees of single waveform similarity of the first node and each probability distribution group by substituting the extracted feature vectors into the representative single waveform probability distributions;

a multiple waveform similarity calculation unit which calculates degrees of multiple waveform similarity by substituting the extracted feature vectors into each of the multiple waveform probability distributions that constitute the representative single waveform probability distributions and are usable to calculate degrees of single waveform similarity in a range; and an output unit outputting a function-performing signal corresponding to a selected one of the multiple waveform probability distributions which results in a highest calculated degree of multiple waveform similarity only when a number of operations for calculating the degrees of the multiple waveform similarity is smaller than a preset threshold or outputting an unregistered word.

24. The apparatus of claim 23, further comprising:
a communication unit which outputs extracted feature vectors; and
a control unit which, when the number of single waveform probability distributions exceeds a threshold value, enables the communication unit to output the extracted feature vectors to a large volume voice recognition apparatus.

25. The apparatus of claim 23, further comprising a probability distribution generation unit which generates the single waveform probability distributions and includes:
a conversion unit which converts multiple waveform probability distributions, which constitute the voice signals corresponding to the second nodes, into single waveform probability distributions; and
a comparison unit which compares degrees of similarity of the single waveform probability distributions that correspond to the respective second node and are obtained by the conversion.

26. The apparatus of claim 25, wherein the probability distributions are Gaussian distributions respectively associated with the unit regions in one to one relationships.

27. The apparatus of claim 23, wherein the feature vector is the features of the voice signal extracted by using at least one of a Linear Predictive Coding (LPC) method, a LPC derived Cepstrum method, a Perceptive Linear Prediction (PLP) method, an audio model feature extraction method, and a Mel-Frequency Cepstrum Coefficients (MFCC) feature extraction method.

28. An apparatus recognizing voice, comprising:
a predicted node extraction unit which extracts a list of second nodes whose travels to a first node corresponding to extracted feature vectors are predicted, with reference to a network of at least one node, the extracted feature vectors being pieces of information about voice frequencies and respectively corresponding to unit regions of an input voice signal;
a single waveform similarity calculation unit which calculates degrees of single waveform similarity of the first node and the second nodes of the list by substituting the extracted feature vectors into single waveform probability distributions that constitute voice signals corresponding to the second nodes;
a multiple waveform similarity calculation unit which calculates degrees of multiple waveform similarity by substituting the extracted feature vectors into multiple waveform probability distributions that constitute single waveform probability distributions and are usable to calculate degrees of single waveform similarity in a range; and
an output unit outputting a function-performing signal corresponding to a selected one of the multiple waveform probability distributions which results in a highest calculated degree of multiple waveform similarity,
the apparatus further comprising:
a probability distribution generation unit which generates the single waveform probability distributions and includes:
a conversion unit which converts multiple waveform probability distributions, which constitute the voice signals corresponding to the second nodes, into single waveform probability distributions; and
a comparison unit which compares degrees of similarity of the single waveform probability distributions that correspond to the respective second node and are obtained by the conversion, wherein
a result of the comparison by the comparison unit is expressible by the following equation when the distributions thereof are Gaussian distributions $$D_{Bhat} = \frac{1}{8}(\mu_2 - \mu_1)^T \left[\frac{\sum_1 + \sum_2}{2}\right]^{-1} (\mu_2 - \mu_1) + \frac{1}{2}\ln\frac{\left|\frac{\sum_1 + \sum_2}{2}\right|}{\sqrt{|\sum_1||\sum_2|}}, \text{ and}$$

wherein $\mu$ is the mean vector of a single waveform probability distribution and $\Sigma$ is a covariance matrix.

29. An apparatus recognizing voice, comprising:
a predicted node extraction unit which extracts a list of second nodes whose travels to a first node corresponding to extracted feature vectors are predicted, with reference to a network of at least one node, the extracted feature vectors being pieces of information about voice frequencies and respectively corresponding to unit regions of an input voice signal;
a single waveform similarity calculation unit which calculates degrees of single waveform similarity of the first node and the second nodes of the list by substituting the extracted feature vectors into single waveform probability distributions that constitute voice signals corresponding to the second nodes;
a multiple waveform similarity calculation unit which calculates degrees of multiple waveform similarity by substituting the extracted feature vectors into multiple waveform probability distributions that constitute single waveform probability distributions and are usable to calculate degrees of single waveform similarity in a range; and
an output unit outputting a function-performing signal corresponding to a selected one of the multiple waveform probability distributions which results in a highest calculated degree of multiple waveform similarity,
the apparatus further comprising:
a probability distribution generation unit which generates the single waveform probability distributions and includes:
a conversion unit which converts multiple waveform probability distributions, which constitute the voice signals corresponding to the second nodes, into single waveform probability distributions; and
a comparison unit which compares degrees of similarity of the single waveform probability distributions that correspond to the respective second node and are obtained by the conversion, wherein
conversion by the conversion unit of each of the multiple waveform probability distributions into the single waveform probability distribution is expressible by the following equation when the distribution thereof is a Gaussian distribution $$N(\mu_s, \sigma_s) \cong \sum_{k=1}^{M} w_k N(\mu_k, \sigma_k), \text{ and}$$

wherein $N(\mu_s,\sigma_s)$ is the single waveform probability distribution, $N(\mu_k,\sigma_k)$ is the multiple waveform probability distribution, $\mu$ and $\sigma$ respectively indicate a mean and a variance, w indicates the weight of each single wave probability distribution included in the multiple waveform probability distribution, and M indicates the number of single wave probability distributions included in the multiple waveform probability distribution.

* * * * *

UNITED STATES PATENT AND TRADEMARK OFFICE
CERTIFICATE OF CORRECTION

Page 1 of 1

PATENT NO. : 8,140,334 B2
APPLICATION NO. : 11/475963
DATED : March 20, 2012
INVENTOR(S) : Sang-bae Jeong et al.

It is certified that error appears in the above-identified patent and that said Letters Patent is hereby corrected as shown below:

Column 16, Line 45, In Claim 8, delete "each which" and insert -- each of which --, therefor.

Column 17, Line 35, In Claim 16, delete "claim 13," and insert -- claim 15, --, therefor.

Signed and Sealed this
Twenty-second Day of May, 2012

David J. Kappos
*Director of the United States Patent and Trademark Office*